(12) United States Patent
Manion et al.

(10) Patent No.: US 7,437,440 B2
(45) Date of Patent: Oct. 14, 2008

(54) PEER-TO-PEER NETWORKING FRAMEWORK APPLICATION PROGRAMMING INTERFACES

(75) Inventors: Todd R. Manion, Redmond, WA (US); Robert D. Donner, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 850 days.

(21) Appl. No.: 10/351,727

(22) Filed: Jan. 27, 2003

(65) Prior Publication Data

US 2004/0148611 A1 Jul. 29, 2004

(51) Int. Cl.
G06F 15/173 (2006.01)
(52) U.S. Cl. .................. 709/223; 709/224; 719/321; 718/1
(58) Field of Classification Search .............. 709/223; 719/321; 718/1
See application file for complete search history.

(56) References Cited

U.S. PATENT DOCUMENTS

| | | | | |
|---|---|---|---|---|
| 5,987,376 | A * | 11/1999 | Olson et al. ............... | 701/201 |
| 2002/0143989 | A1 * | 10/2002 | Huitema et al. ............. | 709/243 |
| 2003/0055892 | A1 | 3/2003 | Huitema et al. | |
| 2003/0056093 | A1 | 3/2003 | Huitema et al. | |
| 2003/0056094 | A1 | 3/2003 | Huitema et al. | |
| 2003/0191753 | A1 * | 10/2003 | Hoch ........................... | 707/3 |
| 2003/0196060 | A1 * | 10/2003 | Miller ......................... | 711/170 |
| 2004/0100953 | A1 * | 5/2004 | Chen et al. .................. | 370/389 |
| 2004/0111469 | A1 | 6/2004 | Manion et al. | |
| 2004/0111515 | A1 * | 6/2004 | Manion et al. ............. | 709/227 |
| 2004/0133640 | A1 * | 7/2004 | Yeager et al. ............... | 709/204 |
| 2004/0148611 | A1 * | 7/2004 | Manion et al. ............. | 719/328 |

OTHER PUBLICATIONS

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Lai, Kevin, and Mary Baker, *Measuring Link Bandwidths Using a Deterministic Model of Packet Delay*, at Department of Computer Science at Stanford University, 13 pages.

(Continued)

*Primary Examiner*—Saleh Najjar
*Assistant Examiner*—Thuong (Tina) T Nguyen
(74) *Attorney, Agent, or Firm*—Marshall, Gerstein & Borun LLP

(57) ABSTRACT

A managed class peer networking framework and associated object-oriented application programming interfaces are presented. An application uses the framework API to communicate with the various peer networking subsystem interfaces. These subsystems utilize lower level Win32 interfaces and services to provide access to the group database, security, and data transfer to other machines. Managed classes are provided for the peer name, identity, cloud, invitation, group, policy, data store, peer and record collections, peer, and record classes. Peer name resolution objects and record search objects are also provided. The peer networking framework of the present invention is particularly applicable to Microsoft's .NET Framework.

9 Claims, 8 Drawing Sheets

OTHER PUBLICATIONS

Rowstron, Antony, and Peter Druschel, *Pastry: Scalable, distributed object location and routing for large-scale peer-to-peer systems*, at Microsoft Research, Ltd., St. George House and Rice University, 20 pages.

Druschel, Peter, and Antony Rowstron, *PAST: A large-scale, persistent peer-to-peer storage utility*, at Rice University and Microsoft Research, 6 pages.

Rowstron, Antony, and Peter Druschel, *Storage management and caching in PAST, a large-scale, persistent peer-to-peer storage utility*, at Microsoft Research, Ltd., St. George House and Rice University, 14 pages.

Rowstron, Antony, Anne-Marie Kermarrec, Peter Druschel, and Miguel Castro, *SCRIBE: The design of a large-scale event notification infrastructure*, at Microsoft Research, Ltd., St. George House and Rice University, 20 pages.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.Ics.mit.edu/chord.

Ellison, C., *SPKI Requirements*, (The Internet Society 1999), at http://www.jeff.org/rfc/rfc2692.txt?number=2692 (last visited Aug. 6, 2001).

Ellison, Carl, Bill Frantz, Butler Lampson, Ron Rivest, Brian M. Thomas, and Tatu Yionen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

* cited by examiner

PEER-TO-PEER NETWORKING FRAMEWORK APPLICATION PROGRAMMING INTERFACES

FIELD OF THE INVENTION

The present invention relates generally to peer-to-peer networking application programming interfaces (APIs), and more particularly to peer networking framework APIs and methods utilizing managed classes.

BACKGROUND OF THE INVENTION

Various communication technologies on the Internet allow users with common interest to collaborate, share files, chat with one another, multi-cast audio and video for presentations and group meetings, and engage in multi-player gaming. Currently, however, most communication on the Internet takes place in a server centric environment whereby all communication flows to or through large central servers to which individuals may connect to join and participate in such communication.

With the reemergence of peer-to-peer technology, the current server centric model of Internet communication is quickly being replaced. Indeed, peer-to-peer technologies enable users to contact one another in a serverless environment, free from the constraints of server based Internet communication. In a peer-to-peer based system, a users anonymity and privacy may be maintained since communication occurs directly between peers within the network. However, while individual communication and file sharing is relatively well established in peer-to-peer networks, establishing, discovering, joining, maintaining, and sharing information in a group peer-to-peer environment is not well established. However, individuals have grown accustomed to the benefits provided by such grouping technology in the server centric environment. Therefore, a need exists for technology that allows both the benefits of peer-to-peer technologies and grouping technologies to be realized in the serverless environment that is peer-to-peer.

As with a server centric environment, groups may be entirely open to allow Internet file searching and sharing within groups. Network location based groups that are typically groups of computers sharing the same access point in a conference room or groups of computers behind a firewall are another type of group known in the server centric world. Additionally, password defined groups allowing for private communication/collaboration within the group, such as secure conference room groups, in home networking groups are also known. External groups, such as NT domain based groups and groups of passport users also exists. Finally, voting based groups that are governed by peer reputation based systems where members are voted in and out are also known. Therefore, the existence of similar groups within the peer-to-peer serverless environment are also desired.

Peer-to-peer communication, and in fact all types of communication, depend on the possibility of establishing valid connections between selected entities or nodes. These entities or nodes may be peers (e.g., users or machines) or groups formed within a peer-to-peer network. The connections between the nodes form the peer-to-peer graph that enables communication and information to be passed to and between the nodes. However, entities may have one or several addresses that may vary because the entities move in the network, because the topology changes, because an address lease cannot be renewed, because the group function or purpose has changed, etc. A classic architectural solution to this addressing problem is thus to assign to each entity a stable name, and to "resolve" this name to a current address when a connection is needed. This name to address translation must be very robust, and it must also allow for easy and fast updates.

To increase the likelihood that an entity's address may be found by those seeking to connect to it, many peer-to-peer protocols allow entities to publish their individual or group address(es) through various mechanisms. Some protocols also allow a client to acquire knowledge of other entities' addresses through the processing of requests from others in the network. Indeed, it is this acquisition of address knowledge that enables successful operation of these peer-to-peer networks by maintaining a robust graph. That is, the better the information about other peers and groups in the network (i.e. the more robust the graph), the greater the likelihood that a search for a particular resource or record will converge.

Additionally, because peer-to-peer networks are formed as a graph of distributed users or peers, it is necessary that group communication be passed to one peer to another before all peers within a network may become cognizant of the shared information. Systems that provide such routing include Usenet and OSPF. However, such current systems suffer from limitations that have, to date, limited the full development of group peer-to-peer technology. Additionally, peer-to-peer networks currently suffer from a lack of adequate graph management that, at times allows the graphs to "break" or become split when one of the members leaves the group. In such an instance, information from one half of the group may no longer be passed to peer members on the other side of the partition created by the departure of one of the peers. As a further disadvantage, no adequate mechanism exists for the detection of such partition.

Currently, P2P systems utilize a logical programming model that requires an extensive amount of code to implement. However, the assignee of the instant application has released the .NET framework programming model. Microsoft's .NET is software that connects information, people, systems, and devices. It spans clients, servers, and developer tools, and comprises the .NET Framework programming model that enables developers to build Web-based applications, smart client applications, and XML Web services applications which expose their functionality programmatically over a network using standard protocols such as SOAP and HTTP. .NET also includes developer tools, such as Microsoft Visual Studios®.NET, which provide a rapid application integrated development environment for programming with the .NET Framework. Further, .NET comprises a set of servers, including Microsoft Windows® 2000, Microsoft SQL Server™, and Microsoft BizTalk® Server, that integrates, runs, operates, and manages XML Web services and applications. Finally, .NET includes client software, such as Windows XP, Windows CE, and Microsoft Office XP, that helps developers deliver a deep and compelling user experience across a family of devices and existing products.

The .NET Framework is the programming model of the .NET environment for building, deploying, and running Web-based applications, smart client applications, and XML Web services. It manages much of the plumbing, enabling developers to focus on writing the business logic code for their applications. The .NET Framework includes the common language runtime and class libraries. The common language runtime is responsible for run time services such as language integration, security enforcement, memory, process, and thread management. In addition, it has a role at development time when features such as life-cycle management, strong type naming, cross-language exception handling, dynamic binding, and so on, reduce the amount of code that a developer must write to turn business logic into a reusable component.

The class libraries include base classes that provide standard functionality such as input/output, string manipulation, security management, network communications, thread management, text management, user interface design features, and other functions. The Microsoft ADO.NET data classes support persistent data management and include SQL classes for manipulating persistent data stores through a standard SQL interface. XML classes enable XML data manipulation and XML searching and translations. The Microsoft ASP-.NET classes support the development of Web-based applications and XML Web services. The Windows Forms classes support the development of Windows-based smart client applications. Together, the class libraries provide a common, consistent development interface across all languages supported by the .NET Framework.

However, despite the clear advantages provided the .NET environment, there are currently no P2P systems that take advantage of the benefits provided by this environment.

BRIEF SUMMARY OF THE INVENTION

The inventive concepts disclosed in this application involve a new and improved managed programming system and method for establishment and management of a peer-to-peer (P2P) network. More specifically, the present invention is directed to a new and improved object-oriented set of Framework interfaces and methods that developers can use to create peer networking applications. By utilizing the managed interfaces of the present invention, which may be used with the .NET Framework, the complicated details of the underlying Win32 implementation are hidden from the developer.

In one embodiment of the present invention, an interface hierarchy is developed. An application uses the peer networking framework application programming interface (API) of the present invention to communicate with the various peer networking subsystems. These lower level Win32 interfaces and services provide access to group database, security, and data transfer to other machines. The core pieces of the peer networking managed APIs may be grouped into five categories. The first relates to an identity object. This object represents a single identity or user in the Peer-to-Peer system. An application can obtain a list of identities that are available on the local computer, delete them, or create new ones. The second relates to a cloud object. The discovery portion of the Peer-to-Peer system defines a set of interconnected computers to be in a specific cloud. Applications can obtain the list of available clouds, register data that can be discovered in that cloud, and resolve (find) peer names that have been registered by other computers in a cloud. The third category relates to groups. One or more identities can join together to form a group in a cloud. The Group object allows a developer to enumerate the members and monitor changes within the group. The data store associated with a group is be used to distribute information between the members of a group. The fourth category relates to the data store. This object holds a set of records for a specific group. An application can add, update, and delete records in the data store. When a record is added to the data store of one member of the group, the peer networking system floods that information to all other members. The fifth category relates to the search. Applications can search the meta data of records in the data store by using the search object. The same interfaces can also be used with a distributed search where the information comes from each active member in the group.

Preferably, the main peer networking classes are defined under a main namespace, e.g. Microsoft.PeerToPeer. Several managed classes are defined under this main namespace that allow for discovery, grouping, record management, and security. In one embodiment, a discovery managed class, e.g. Microsoft.PeerToPeer.Discovery, exposes interfaces that provide peer name resolution through a peer-to-peer name resolution protocol. An identity managed class, e.g. Microsoft.PeerToPeer.Identity, includes a collection of secure identity routines that are used to manage a person's identity information within the P2P system. Additionally, a group managed class, e.g. Microsoft.PeerToPeer.Group, contains a collection of grouping interfaces. In addition to maintaining the information about the group policy and peers, this managed class also provides a means to access the data store for the group records.

In one embodiment of the present invention, managed application programming interfaces (APIs) for the identity class of objects are provided that create peer identities, that retrieve friendly names of identities, that set friendly names of identities, that get cryptographic key information for an identity, that delete peer identities, that export peer identity information, that import peer identity information, that enumerates peer identities, that enumerates groups associated with peer identities, that retrieves XML fragments containing security information for an identity, and that creates peer names based on existing names of identities. Each of these interfaces utilize various parameters that are passed in from an application program that uses these interfaces to manage a peer identity. The interfaces return a value that indicates the success or failure of the function. For failures, the interfaces provide an indication as to the problem resulting in the failure.

In another embodiment of the present invention, managed APIs for the discovery class are provided. Discovery involves registering information on one machine, and finding such data from another in the same cloud of machines. Preferably, the application uses a peer name register object to publish the discoverable peer name. Other machines can then use a peer name resolver object to find the information. The managed APIs also include functionality to obtain information about the cloud and to watch for and signal cloud changes to the application.

In a still further embodiment of the present invention, managed APIs and methods are exposed to the application writers in order to establish peer-to-peer groups and to efficiently and reliably pass data between its members. The grouping framework ensures that each member has a consistent view of the data in the group. The core piece of the grouping technology is the group member node (hereinafter "member"). A member represents a particular instance of an individual on the network who is a member of the group. Members are able to connect to each other to form, expand, contract, etc. a group. The members are able to send data between each other in the form of records.

Group records are essentially pieces of data flooded (sent) to all members in a group. Once a group record (hereinafter "record") has been received by a member, the member places the record in a group database or data store. Grouping is responsible for ensuring each member's group database has the exact same view of the data in the group. It keeps each member synchronized. As members connect and disconnect from groups, partitions or "splits" in the group may occur. Grouping is also responsible for detecting and repairing these partitions. If they desire to do so, members in the group can create connections separate from the traditional group connections. These group direct connections allow members to send arbitrary data to each other individually. Finally, grouping has an eventing infrastructure that allows applications to register and receive event notifications. Event notifications are the mechanism grouping uses to alert applications to the fact that something has changed within the group.

Managed APIs are included that provide group creation and access management. These APIs create a new group, allow a peer to join a group, open an existing group for connection, connect to a group, close a group, delete a group, create a group invitation, and parse a group invitation. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

In another embodiment of the present invention, managed APIs are provided that provide the retrieval and management of group and member information. These APIs get group status, get group properties, set group properties, enumerate the group members, and authorize the credential renewal of members. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

In a further embodiment of the present invention, a data store class, e.g. Microsoft.PeerToPeer.Store is provided. This is the class that controls access to the records within a group. The group state must be either connected or disconnected, otherwise attempting to perform any operation will cause an exception. Managed APIs are provided that provide this record management. These APIs add records, update records, delete records, retrieve records, enumerate records, and search for records. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
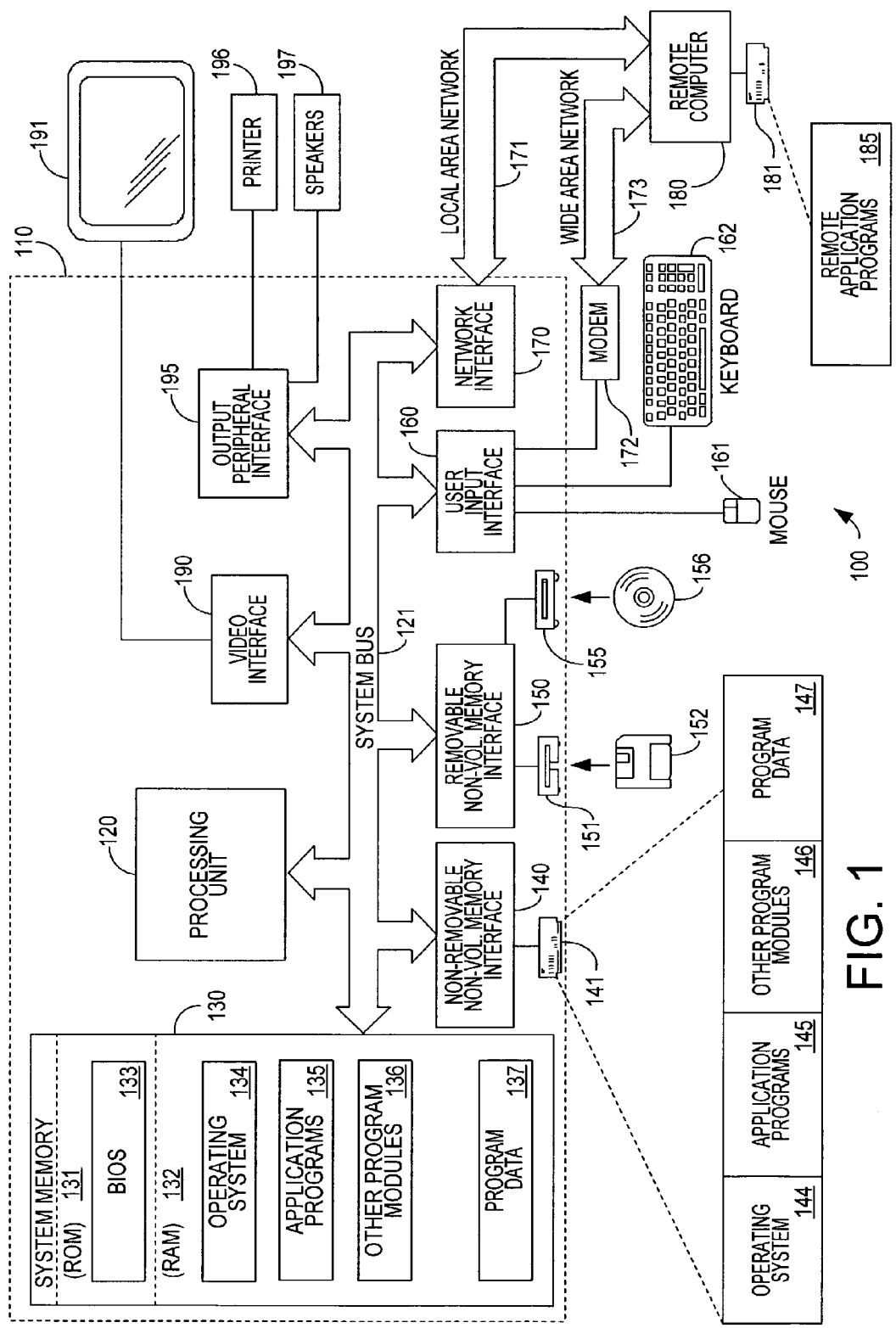
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network member, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As introduced above, the success of a peer-to-peer (P2P) protocol depends on the protocol's ability to establish valid connections between selected entities. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peer-to-peer name resolution protocol (PNRP) to which the grouping system and method of the instant invention finds particular applicability, although by which the present invention is not limited, is described in co-pending application Ser. No. 09/942,164, entitled Peer-To-Peer Name Resolution Protocol (PNRP) And Multilevel Cache For Use Therewith, filed on Aug. 29, 2001, in co-pending application Ser. No. 10/122,863, entitled Multi-Level Cache Architecture and Cache Management Method for Peer-To-Peer Name Resolution Protocol, filed Apr. 15, 2002, and in co-pending application Ser. No. 09/955,923, entitled Peer-To-Peer Group Management and Method For Maintaining Peer-To-Peer Graphs, filed on Sep. 19, 2001, the teachings and disclosure of which are hereby incorporated in their entireties by reference thereto.

However, one skilled in the art will recognize from the following teachings that the managed P2P interfaces and methods of the present invention are not limited to the particular peer-to-peer protocol of these co-pending applications, but may be applied to other resolution and grouping protocols with equal force. Likewise, co-pending application Ser. No. 09/956,260, entitled Peer-To-Peer Name Resolution Protocol (PNRP) Security Infrastructure And Method, filed on Sep. 19, 2001 describes an underlying security infrastructure that ensures that the identities of the various entities within the network are valid, without unnecessary burdening the network with excess traffic. In the P2P grouping environment, co-pending application Ser. No. 09/955,924, entitled Peer-To-Peer Name Resolution Protocol (PNRP) Group Security Infrastructure and Method, filed on Sep. 19, 2001, describes the underlying security infrastructure used for such groups. The teachings and disclosure of these applications are also incorporated in their entireties by reference thereto. However, while the interfaces and methods of the present invention find particular applicability to and interaction with such PNRP, one skilled in the art will recognize that the present invention is not limited thereby, but has applicability to any P2P system or protocol that desires to provide a managed set of functions, and particularly to any P2P system that desires to take advantage of the benefits provided by the .NET framework.

As discussed in the above-incorporated co-pending application describing the PNRP, and to provide some useful background, establishing peering relations between individual peers is an expensive process in existing peer-to-peer networks. In the PNRP, however, each member accumulates a routing table that contains a list of references to other members in the network. For each member entry, address information, which may include a member identification, address, the key of the member, and the distance between the key of this member and the key of the local member are obtained. Each time the local member learns about a remote member, it checks whether the member is already known, and if not whether to enter an entry in the routing table. Each entry has an 'ideal cache level' determined by its 'distance' from the cache owner. New entries may only be added to the cache level corresponding to their distance, or to the lowest level if the entry's 'ideal cache level' has not been breached yet.

For communication between individual peers in PNRP, when a member receives a query it searches for the entry in its routing table whose key best matches the target, excluding the members that have already been visited. The query is then forwarded directly to the member that advertised the entry. If there is no adequate entry, the request is sent back to the member from which the request was received; this member will try another entry in its own routing table. The request is successful if it reaches the entry whose key matches the target. It is unsuccessful if the target is not reached in the maximum number of steps, or if the member from which the request was received tries all possible neighbors and receives a negative response. In the case of successful requests, the response is relayed by all intermediate hops. It carries the address of the member that held the target key, and this entry can be inserted in the routing tables of the intermediate members.

As with many successful P2P protocols, entities (both individual peers as well as groups) can be published for easy discovery. To provide security and integrity to the P2P protocol, however, each identity preferably includes an attached identity certificate. The keeper of the ID's private key uses the certificate to attach additional information to the ID, such as the friendly name, etc. Preferably, each member generates its own pair of private public keys, although such may be provided by a trusted supplier. The public key is then included as part of the member identifier. Likewise, a group creator generates group public and private keys. Only the member that created the pair of keys has the private key with which it can prove that it is the creator of the identity. In this way, identity theft may be discovered, and is, therefore, deterred.

As also discussed in this above-identified application, peer identification certificates provide integrity and validity to a peer's identity in the P2P network. These ID certificates are of the form [Version, ID, <ID Related Info>, Validity, Algorithms, $P_{Issuer}$]$K_{Issuer}$. As used in this certificate representation, Version is the certificate version, ID is the peer name to be published, <ID Related Info> represents information to be associated with the ID, Validity represents the period of validity expressed in a pair of From-To dates expressed as Universal Date Time (also know as Greenwich Mean Time (GMT)), Algorithms refers to the algorithms used for generating the key pairs, and for signing, and $P_{Issuer}$ is the public key of the certificate issuer. If the certificate issuer is the same as the ID owner then this can be left blank. In such a case it is assumed that $P_{Issuer}=P_{ID}$. The term $K_{Issuer}$ is the private key pair of $P_{Issuer}$. If the certificate issuer is the ID owner then this is $K_{ID}$, the private key of the ID owner.

In the P2P group context, a group membership certificate of similar structure wherein the <ID Related Info> comprises the Peer name that is certified as the member of the group, and a certificate Serial Number. Such a group membership certificate is of the structure [Version, ID, Peer ID, Serial Number, Validity, Algorithms, $P_{ID}$, $P_{Issuer}$]$K_{Issuer}$. As used therein, ID is the Group ID, Peer ID is the Peer name that is certified as a member of the group, Serial Number is the certificate serial number per issuer. PNRP allows every issuer to keep its own numbering scheme. Preferably, certificate serial numbers are globally unique (GUID, unless the computer does not have a network card. The Validity refers to the period of validity expressed in a pair of From-To dates, $P_{ID}$ is the public key from which the ID was derived, and $P_{Issuer}$ is the public key of the certificate issuer. If the certificate issuer is the same as the ID owner then this field can be left blank and it will be assumed that $P_{Issuer}=P_{ID}$. $K_{Issuer}$ is the private key pair Of $P_{Issuer}$. If the certificate issuer is the ID owner then this is $K_{ID}$, the private key pair of the ID owner.

This group membership certificate may be used to verify that the specified Peer ID is a member of the group with the specified group ID. This information is signed with the private key of the issuer $K_{Issuer}$. Depending on the group security policy selected, any group member or only a smaller set called group owners can be certificate issuers. In all cases, however, to verify that the issuer is certified to issue such certificates a chain of group membership certificates has to exist that leads to a certificate signed with the group private key.

Figure 2:
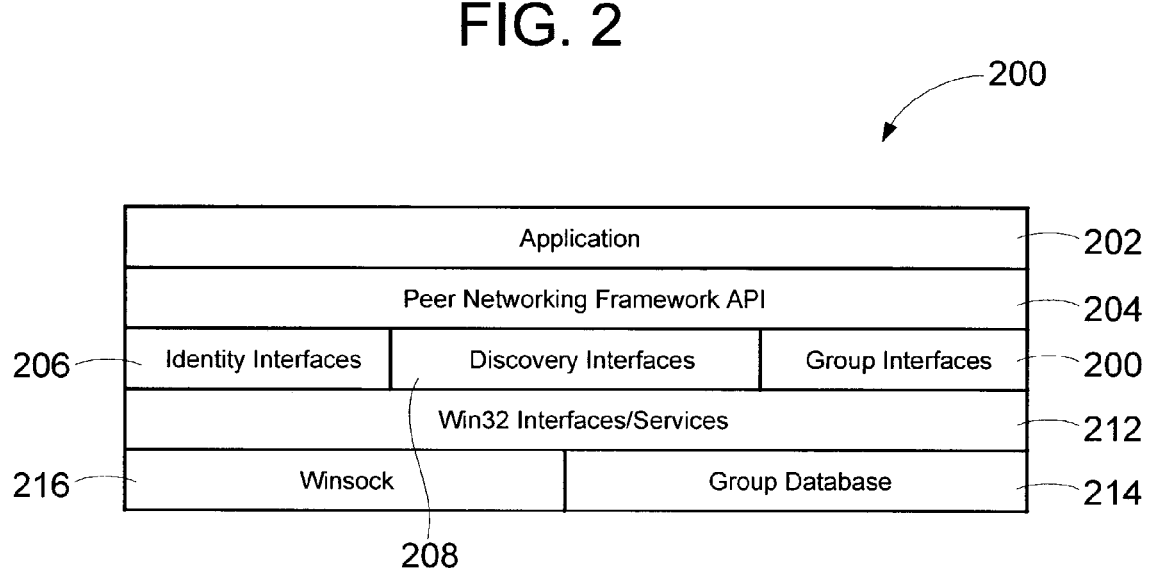
FIG. 2 is a simplified framework diagram illustrating a peer-to-peer (P2P) interface framework into which the system and methods of the present invention find particular applicability.

Having now provided one P2P environment to which the managed system and methods of the present invention finds particular applicability, attention is now directed to FIG. 2. This FIG. 2 illustrates an exemplary P2P interface hierarchy 200 in which the peer networking framework APIs of the present invention may exist, although it is not limited for use with only such hierarchy. Indeed, the system and methods of the present invention may be used with various frameworks which need or desire a managed, coordinated set of interfaces that allow complete management of P2P functionality. Of course one skilled in the art will recognize that various application programs can utilize the managed APIs of the present invention to provide a rich user interface and a set of functions that allow management the P2P environment, particularly with the .NET Framework.

As illustrated in this FIG. 2, an application 202 uses the peer networking framework API 204 to communicate with the various peer networking subsystems 206, 208, and 210. The lower level Win32 interfaces and services 212 provide access to the group database 214, security and data transfer via, e.g. Winsock 216 in this exemplary embodiment, to other machines. The peer networking framework API 204 includes a namespace, e.g. Microsoft.PeerToPeer, under which the main peer networking classes are defined. Discover, grouping, record management, and security are all defined under this main namespace, as will be discussed more fully below.

Included in the underlying Win32 interfaces/services 212 are graphing interfaces that are responsible for establishing and maintain a well-connected graph of peers. A description of one embodiment of such graphing interfaces is contained in co-pending application Ser. No. 10/309,865, entitled Peer-To-Peer Graphing Interfaces and Methods, filed on Dec. 4, 2002, the teaching and disclosure of which are hereby incorporated in their entireties by reference thereto. Some form of P2P name-to-address resolution 208 must also typically be provided to allow the P2P system to function. As discussed above, one such system is the PNRP system described in the above identified co-pending applications. These Win32 interfaces also include identity interfaces. A description of one embodiment of these identity management interfaces is contained in co-pending application Ser. No. 10/309,864, entitled Peer-To-Peer Identity Management Interfaces And Methods, filed on Dec. 4, 2002, the teachings and disclosure of which are hereby incorporated in their entireties by reference thereto. Finally, a set of Win32 grouping interfaces are also provided to allow proper participation in P2P groups. A description of one embodiment of such grouping interfaces is contained in co-pending application Ser. No. 10/351,905, entitled Peer-To-Peer Grouping Interfaces and Methods, filed on even date herewith, the teachings and disclosure of which are hereby incorporated in their entireties by reference thereto.

As will become apparent to those skilled in the art from the following description, the APIs and methods of the present invention preferably take an object-oriented approach to their design. Objects have the base implementations for ToStrings, Equals, etc., except where explicitly called out. Collections are almost always static snapshots of an underlying dynamic lists. A GetXxx method is normally used to obtain the collection instead of using a property. Some objects can be serialized so that they can be stored or transmitted to another machine. As will become apparent, records and invitations are examples of this. The group classes, on the other hand, cannot be converted to a XML/text format since they represent transient data, specific to the local machine, and cannot be persisted. In order for the serialization to work, any IDs used within the group must be unique and consistent, e.g. record IDs, group IDs, peer IDs.

Figure 3:
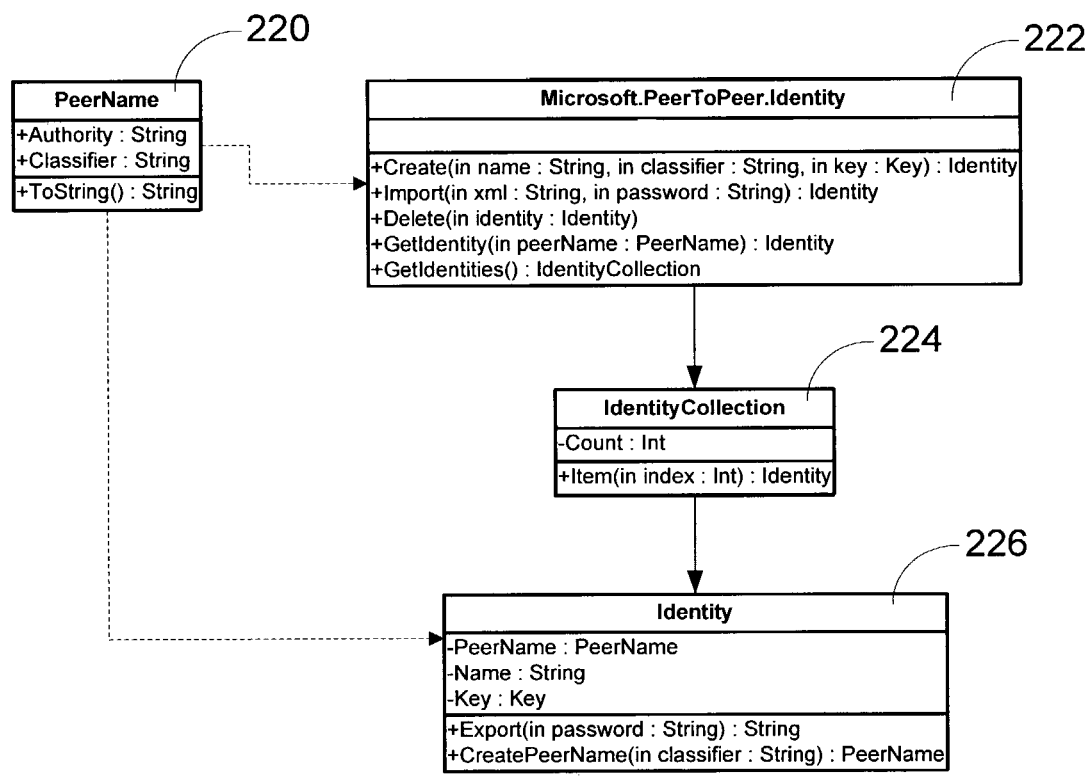
FIG. 3 illustrates the objects, collections, properties, and methods of the identity managed class of the present invention.

In order for an application to participate in the P2P framework of the present invention, the application must create a new peer identity or select an existing one. Such an identity is required to participate in groups or register a peer name in the P2P system. As illustrated in FIG. 3, the PeerName class object 220 is a simple string that represents the basis of a peer to peer identifier with the following structure: <authority>.<classifier>. Either the authority or classifier must be non-empty strings. The authority is normally a 128-bit value that applications should not normally have to deal with. The classifier is an application-specified string that is used to differentiate the various PeerNames.

The constructors of the PeerName class object include PeerName(String authority, String classifier). This version of the constructor allows the application to specify the two parts of the PeerName. The constructors also include PeerName (String peerName). This version of the constructor allows the application to specify the entire PeerName. The string must contain a "." to indicate the separation between the authority and classifier parts. The properties of this class include the string authority, which represents just the first part of the PeerName, before the first period. Applications should not normally specify the authority. It is usually a 128-bit value, based on some security context. It is the user's identity or the group certificate. The other property of this class, the string classifier, represents the second part of the PeerName, after the first colon. Applications should select unique classifier names to differentiate PeerNames. The only static method exposed by this class is the ToString( ) method, which returns a string which represents the entire PeerName.

The Microsoft.PeerToPeer.Identity class 222 is a collection of secure identity routines that are used to manage a person's information within the peer to peer system. Initially it contains five static functions. The first of these static functions allows a user to create a new identity. A user may also import an identity and identity. The password is used to decrypt the XML data that must be the result of calling the export function described below. A user may also delete an identity. The user may also retrieve an identity associated with the unique PeerName through the get identity function.

Further, the user may retrieve an enumeration of all identities registered on the local machine associated with the user through the get identities function. An identity collection 224 is constructed as a result of this last static function, which contains a count of all identities in the identity collection 224. This identity collection 224 exposes a static function that allows a user to retrieve any particular identity 226.

The identity 226 is used to define the information about a user so that they can participate in the peer networking system. A user can have more than one identity 226, and the same identity 226 can be used in more than one group. An identity 226 consists of a unique identifier (e.g. the PeerName 220) and a string that is the user's friendly name. Each of these properties are read only. Internally, the class 226 also maintains public/private key pairs, group membership and ownership data. The identity 226 also exposes a static function that allows the identity 226 to be exported as an XML structure that can be imported by another machine using the import identity function described above. The password is used to encrypt the data. The identity class 226 also exposes a static function that allows for the creation of a new peer name 220. An example of code that performs this identity creation in one embodiment is as follows:

```
String UserName = "John Doe";
String UserClass = "personal";
Identity myIdentity = null;
IdentityCollection identities =
Microsoft.PeerToPeer.Identity.GetIdentities( );
foreach (Identity identity in identities)
{
    if ((identity.Name == UserName) && (identity.PeerName.Classifier ==
    UserClass))
    {
        myIdentity = identity;
        break;
    }
}
if (null == myIdentity)
{
    myIdentity = Microsoft.PeerToPeer.Identity.Create(UserName,
    UserClass);
}
Debug.WriteLine("PeerName for " + UserName);
Debug.WriteLine(myIdentity.PeerName.ToString( ));
```

Figure 4:
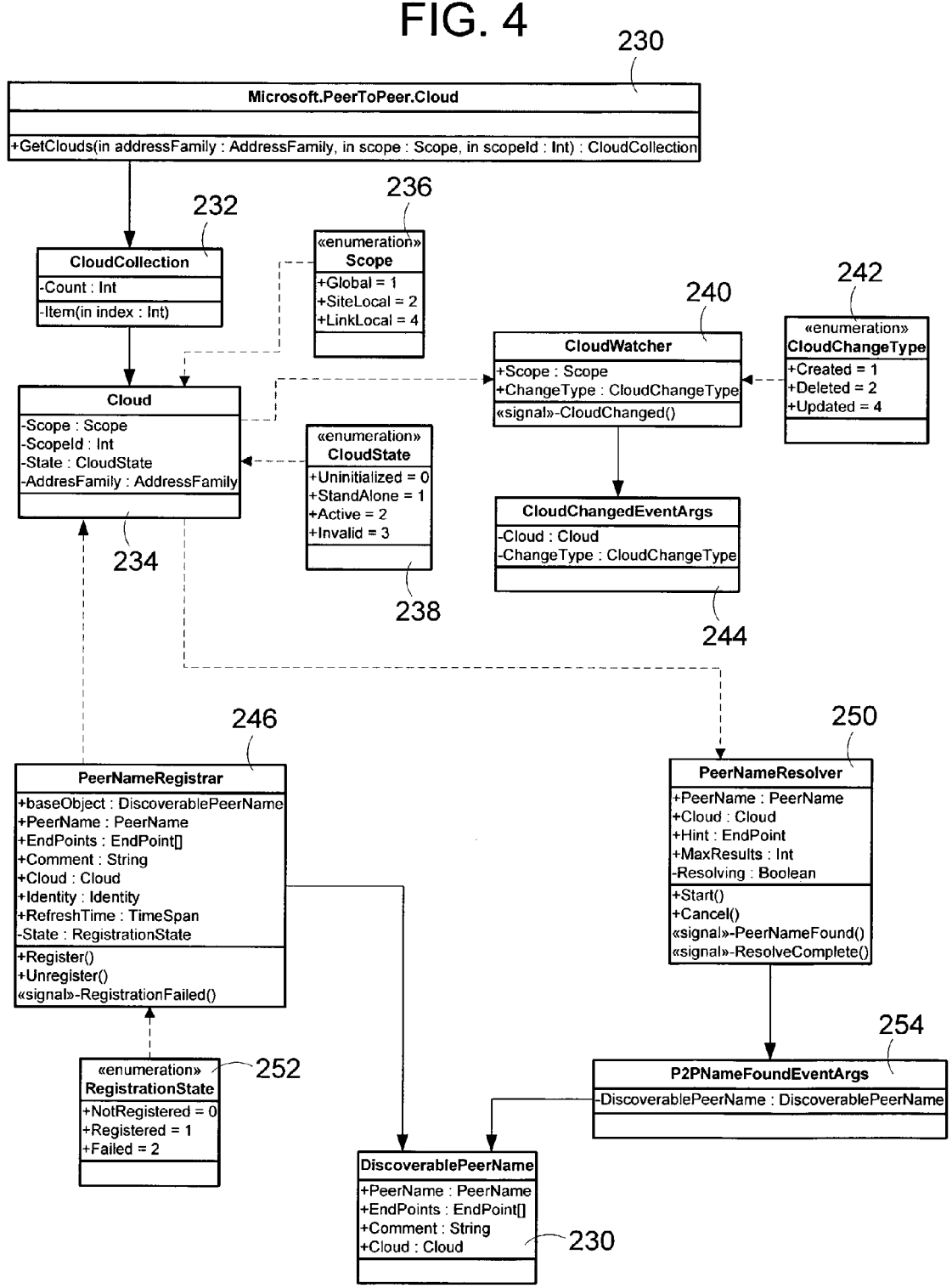
FIG. 4 illustrates the objects, collections, properties, and methods of the cloud managed class of the present invention.

Discovery in the peer networking system of the present invention involves registering information on one machine and finding that data from another in the same cloud of machines. As illustrated in FIG. 4, an application learns of the clouds from which data could be found through the static function get clouds exposed by the Microsoft.PeerToPeer .Cloud class 230. This static function returns a cloud collection object 232 that includes a count of the cloud enumeration. A particular cloud 234 object can then be retrieved from this enumeration. A cloud 234 defines a set of reachable nodes. Each cloud 234 is identified by the type of address and network scope 236 for which the cloud is valid. The cloud scope 236 defines the network span in which an address is valid, and the cloud state 238 defines the state of the cloud, i.e. uninitialized, stand alone, active, or invalid. The address family property indicates the type of address used in this cloud.

The cloud watcher class 240 is used to watch for changes to a set of clouds. Applications should first create a handler for the cloud changed event, and then set the scope and type of change 242 that they are interested in, preferably the default is all. Such change types 242 include notification when a cloud is created, deleted, or upgraded, although the default is preferably none. Once the cloud changed notification is triggered, the application can retrieve the cloud changed event arguments 244 to determine what cloud changed, and how it changed.

Once a particular cloud is set, the application uses a peer name registrar object 246 to publish the discoverable peer name 248 through the register static method. The discoverable peer name class 248 defines the information that can be registered. While all of the items are optional in the constructor, the peer name and the cloud must be set before the object 248 can be registered. This information is then available for discovery by another machine through the peer name resolver 250 discussed more fully below. The registration state enumeration 252 provides an indication of the status of the registration, including providing a signal upon registration failure of if a problem is encountered with the cloud after the peer name has been successfully registered. An error code will preferably be provided to indicate the reason for the failure. The peer name registrar object 246 also exposes an unregister static method that removes the registration for the object 248. The end points property specifies an array of end points (addresses) associated with the object 248. That is, an application registers a peer name for a specific identity and a set of endpoints within a cloud. The constructor for the peer name registrar 246 requires an identity and the same properties as the base class 248. The refresh time parameter is optional and defaults to four hours in one embodiment of the present invention. An example of code that illustrates the publication of a peer name in the global cloud in accordance with one embodiment of the present invention is as follows:

```
PeerName peerName = new PeerName("authority", "classifier");
EndPoint[ ] endPoints; //?
CloudCollection clouds =
        Microsoft.PeerToPeer.Cloud.GetClouds(System.Net.Sockets.
AddressFamily.InterNetworkV6, Scope.Global);
Debug.Assert(clouds.Count == 1);
Cloud globalCloud = clouds[0];
DiscoverablePeerName dName = new DiscoverablePeerName(peerName,
endPoints, "comment", globalCloud);
PeerNameRegistrar regName = new PeerNameRegistrar(myIdentity,
dName);
regName.Register( );
```

To find information 248 that other machines have registered, an application can use the peer name resolver object 250. The constructor sets the two properties necessary for resolving a peer name. In order to process any results, the application must first hook into the name found event 254 before calling the start static method. The application specifies the peer name to resolve, the cloud to search on, and an end point hint to finding the peer name. Setting this last property is optional in a preferred embodiment, but doing so may provide better results. The application can also set the maximum number of results that the system should attempt to find, although the default is all. The Boolean resolving property is true when the system is actively searching. The start method is called to star the resolving process. After this call returns, the resolving property will be true until the resolve complete event is raised. The cancel method stops the resolution process. The resolving property will be false after this call returns. The peer name found event will fire as results are found, one at a time. The main property of the peer name found event arguments 254 is the discoverable peer name 248. Finally, the resolve complete event is fired when the resolve operation is complete. An example of code that illustrates the publication of a peer name in the global cloud in accordance with one embodiment of the present invention is as follows:

```
...
PeerNameResolver resolver = new PeerNameResolver(peerName,
globalCloud, null, 10);
resolver.NameFound += new
PeerNameResolver.PeerNameFoundEventHandler
(MyNameFoundEventHandler);
resolver.Start( );
...
void MyNameFoundEventHandler(Object sender,
PeerNameFoundEventArgs e)
{
  Debug.WriteLine("PeerName: " + e.DiscoverablePeerName.PeerName);
  Debug.WriteLine("Comment: " + e.DiscoverablePeerName.Comment);
}
```

Figure 5:
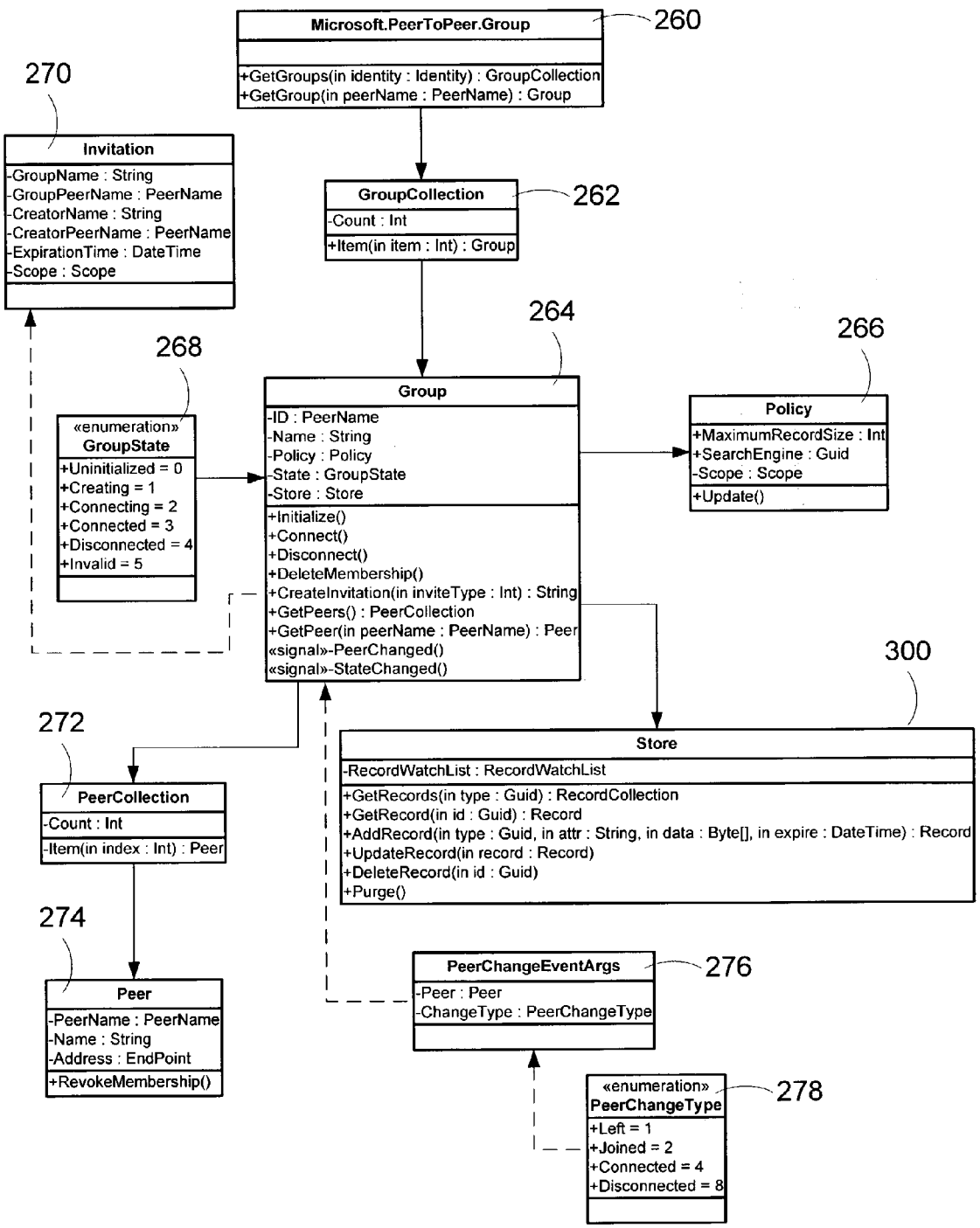
FIG. 5 illustrates the objects, collections, properties, and methods of the group managed class of the present invention.

As illustrated in FIG. 5, the Microsoft.PeerToPeer.Group 260 is the main class for group operations and the starting point from which to retrieve peer data. This object exposes two static functions that allow an application to retrieve a group collection 262, or an individual group 264. The group collection 262 provides a count of all groups enumerated that are associated with a particular identity, and exposes a static function that allows an application to select an individual group 264. This function retrieves the group associated with a specific group PeerName. If another process on the same machine is using the same group with the same identity, the group state 268 may be connected after the initialize method (discussed below) is called. Otherwise, the application should call connect (discussed below) to attempt to establish a connection with other members.

The group class 264 provides the basic create mechanism of establishing a new group. All parameters are required, and the application must call the initialize static method before attempting to perform any other operations. An exception is thrown if any of the parameters are invalid. The properties of this class 264 include the peer name, which is the group identifier, and the friendly group name. The policy for the group is defined by the policy class 266, which specifies the maximum record size for the group, the search engine, and the scope. This policy class 266 also exposes an update static method. The group state property indicates the current state of the group from the group state class 268. A normal group state progresses from uninitialized to creating to connected. A group will become invalid when the user's membership in the group is deleted. The disconnect method changes the group state to disconnected, thereby allowing access to the records without being distracted by updates from other peers. The final property of the group class 264 is the designation of the data store 300 (discussed in detail below with regard to FIG. 7) for the group.

The group class 264 exposes several static methods. The initialize method must be used to move the object's from the Unitialized state. No events will be fired before the application calls this method. The connect method can be used to attempt to reconnect to other peers. It is only necessary to calls this method if the group's state is disconnected. The disconnect method can be used to disconnect from the group, while the delete membership method allows a peer to leave a group permanently. When this occurs, the group state is changed to invalid. None of the records in the store 300 are accessible after the application makes this call. The object will be removed from the group collection for the identity. The static method create invitation creates an XML invitation 270 that can be used to join the group. An exception will be raised if the user does not have the right to create invitations. The group class 264 also exposes the get peers method, which creates a peer collection 272 of all the peers in the group. The get peer function retrieves the peer object 274 associated with the peer ID.

The group class 264 also provides indications for various events. One such notification is fired when the peer state has changed. The peer change event argument class 276 provides notification of the peer change type 278, such as is a peer has left the group, joined the group, connected to the group, or disconnected from the group.

Figure 6:
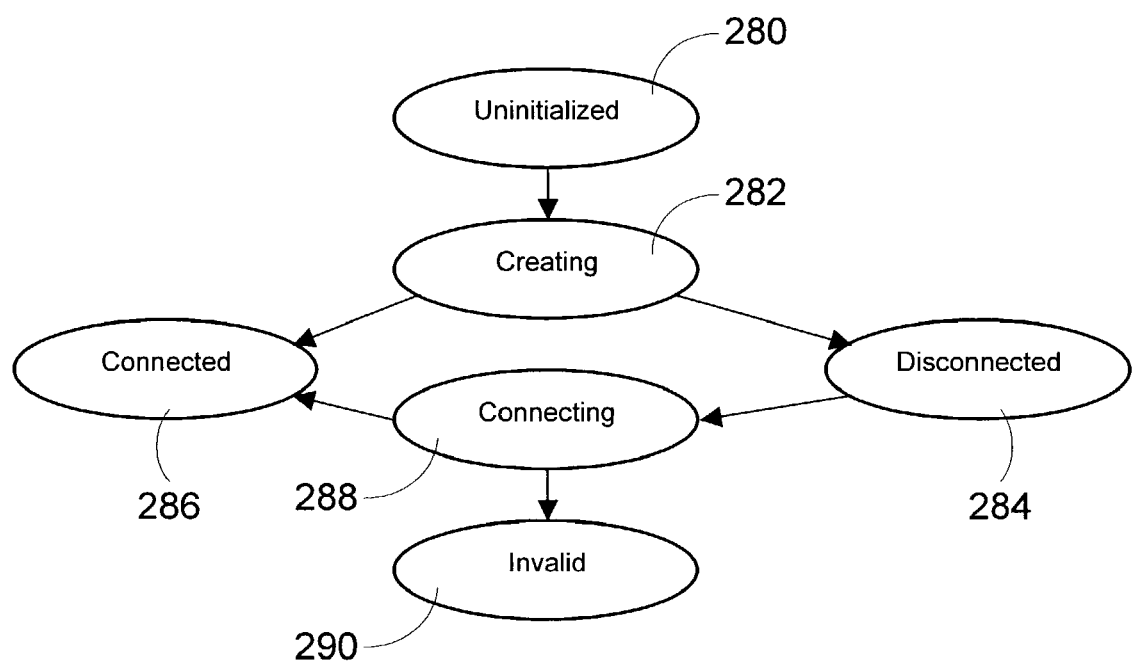
FIG. 6 is a state diagram of the states in and through which the group class may exist.

The group state object 268 provides the various states in which the group object 264 can exist. As illustrated in FIG. 6, a group object begins in the uninitialized state 280. In this state the application can hook into events and retrieve read-only properties, but it can not modify records or expect to see other nodes. The application must call the initialize function to transition to another state. After the initialize call, it transitions through the creating state 282 and on to either the disconnected state 284 or the connected state 286. The creating state 282 is an intermediate state which is the result of using the Initialize method. The disconnected state 284 will be entered if this is a new group or if it is an existing group with no other applications using it. The group is valid, but there are currently no connections to other peers. Although the application can assume no new data will be received from remote system, it (or another application on the same machine) can still add records and be notified of updates to the store 300. From the disconnected state 284, the state will transition through the intermediate connecting state 288 (as a result of using the connect method) to the connected state 286. The connected state 286 may also be entered directly if the group was created as a result of accepting an invitation or if another application was already using the group. In this connected state 286, the group is active and ready to accept new peers. Records may be sent and received. Alternatively, the group state may be invalid 290. In this state, the group object is invalid and no access to the group data or peers is permitted. This is a terminal state.

As introduces above, the group policy 266 (see FIG. 5) is the class that controls the policies within a group. Applications can read the policies currently in place, but may not be able to modify them if they do have the proper role/right. Note that rights/roles can be added, but not removed and at this point. There are no strings associated with the values. The properties of the group policy class 266 include the designation of the maximum size of a user-defined record that will be flooded to another node. In one embodiment, the default is 10,000 bytes. This policy class 266 may also define the ID of the search engine that will be used in the group. By default in one embodiment, this is the local group search engine. The scope in which the group exists is also specified. This policy class 266 also exposes an update function that updates the group associated with this policy. If the user/identity does not have the right to do this, this will generate an exception.

Also as introduced above, the group invitation 270 class is used to gain access to an existing group. A valid user in the group must first use the create invitation method (exposed in the group object 264) to generate the XML data, which can be passed (e.g. out of band, via email, via a web page, etc.) to the local system, and to convert it into an invitation object 270. The invitation object 270 can be used to join an existing group. The properties of the invitation object 270 include the group name of the group for which the invitation is intended. The peer name property specifies the unique identifier for this invitation. The creator name is the friendly name of the user who created the invitation, while the creator peer name property is the unique identifier for the identity which created the invitation. The invitation object 270 also specifies the expiration time, i.e. the date/time after which the invitation will expire. The scope is also provided.

The peer object 274 introduced above represents an instance of a user (or member) in the group. This object 274 specifies the peer name for the user, the friendly name for the user, and the endpoint (IP address) for the peer. Further, this object 274 provides an indication of whether the peer is currently present in the group. This peer object 274 also exposes a revoke membership static function. This function revokes the user's ability to participate in the group. However, the local user must have the right to perform this operation. This peer object 274 can be accessed directly from the group object 264 via the get peer function, or through the peer collection object 272 introduced above. This collection object 272 is a snapshot of the peers of which the local node is aware (neighbors and flooded participant records). The peer item function exposed by this collection object 272 is the method by which an application can retrieve any particular peer object 274 in the collection.

The following is an example of code that illustrates the creation of a new group called "Fish People" in accordance with one embodiment of the present invention. Once the group is created, the application registers for notifications before the group is connected so that the application will be sure to catch all changes.

```
Identity myIdentity = GetMyIdentity( );
String groupName = "Fish People";
String classifier = "fishy";
Group group = new Group(myIdentity, groupName, classifier);
group.PeerChange +=
new PeerChangedEventHandler(MyPeerChangeHandler);
group.Graph.NodeChange +=
new NodeChangedEventHandler(MyNodeChangeHandler);
group.Initialize( );
...
Void MyNodeChangeHandler(Object sender, NodeChangeEventArgs e)
{
  Debug.Writeline("Added node " + e.Node.ToString( ));
}
Void MyPeerChangeHandler(Object sender, PeerChangeEventArgs e)
{
  Debug.Writeline("Added peer " + e.Peer.Name);
}
```

The following is an example of code that illustrates the retrieval of the first group from the group collection object 262 and the connection to that group in accordance with one embodiment of the present invention:

```
Identity myIdentity = GetMyIdentity( );
GroupCollection groups = Group.GetGroups(myIdentity);
Group oldGroup = groups[0];
group.Initialize( );
group.Connect( );
//...wait for group state to change to connected
Debug.Writeline(group.GetPeers( ).Count + " peers");
Debug.Writeline(group.GetRecords( ).Count + " records");
```

The following is an example of code that illustrates the creation of an group invitation by a valid peer in the group that will allow another machine to join the group:

```
String xmlInvite = group.CreateInvitiation( );
//send xmlInvite to other machine, out of band
...
```

The following is an example of code that illustrates the joining of a group by a machine that has received the group invitation from a valid peer in the group:

```
String xmlInvite; // get this out of band
Invitation invitation = new Invitation(xmlInvite);
Debug.Writeline("Attempting to join " + invitation.GroupName);
Identity myIdentity = GetMyIdentity( );
Group group = invitation.Accept(myIdentity);
RecordWatcher watcher = new RecordWatcher( );
watcher.ChangeType = RecordChangeType.Created |
RecordChangeType.Updated;
watcher.RecordChange +=
new RecordChangedEventHandler(MyRecordChange);
group.Store.GetRecordWatchList( ).Add(watcher);
group.StateChanged +=
new GroupStateChangedEventHandler(MyStateChange);
group.Initialize( );
...
Void MyStateChange(Object sender, GroupStateChangeEventArgs e)
{
  Debug.Writeline("Group State: " + e.State);
}
Void MyRecordChange(Object sender, RecordChangeEventArgs e)
{
  if (e.RecordChangeType == RecordChangeType.Created)
  {
    Debug.Writeline("Record Added " + e.Record.ID);
  }
  else if (e.RecordChangeType == RecordChangeType.Updated)
  {
    Debug.Writeline("Record Updated " + e.Record.ID);
  }
}
```

Figure 7:
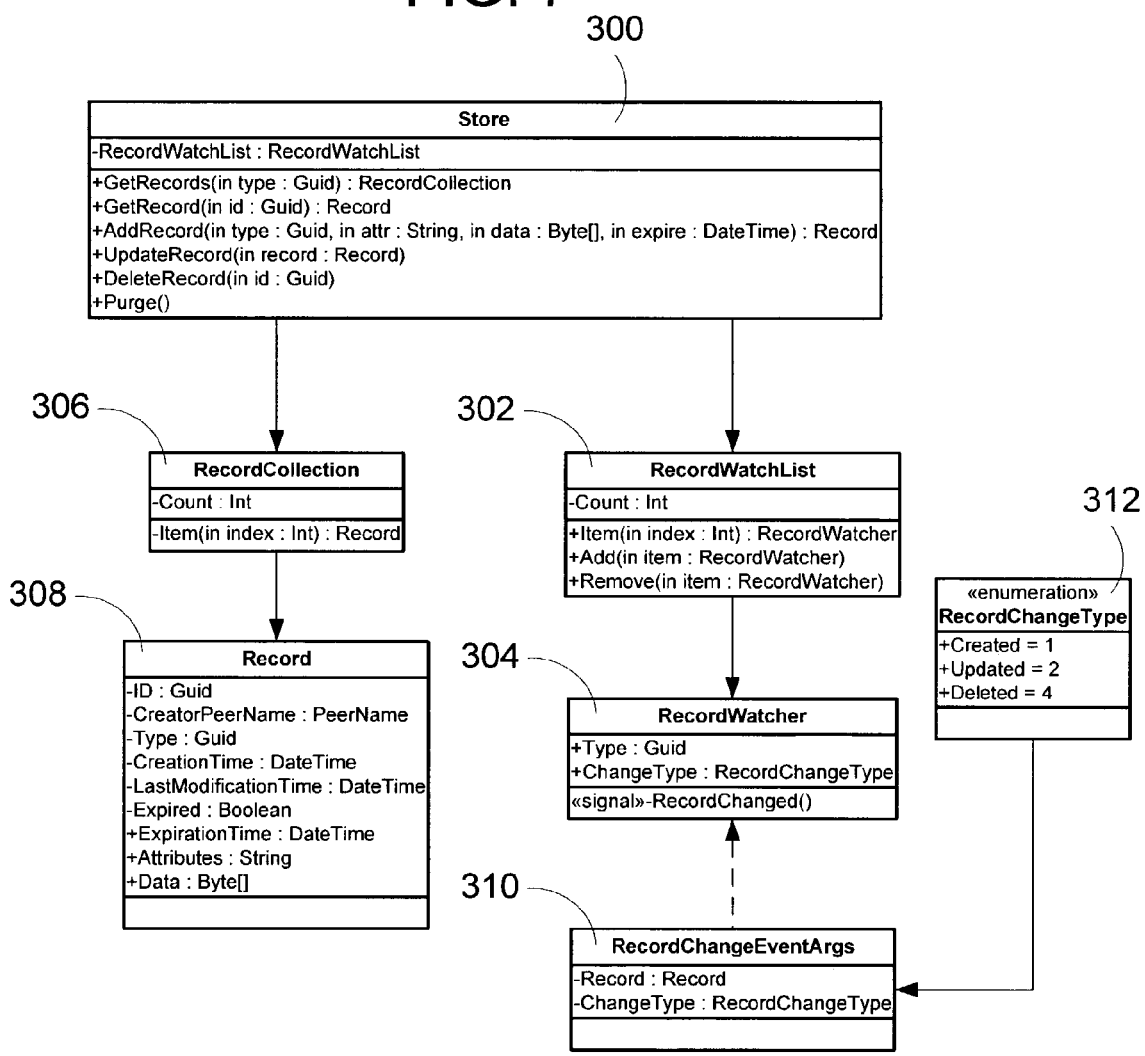
FIG. 7 illustrates the objects, collections, properties, and methods of the store and record managed classes of the present invention.

As illustrated in FIG. 7, the store class 300 is the class that controls access to the records within a group. The group state must be either connected or disconnected; otherwise attempting to perform any operation will cause an exception. The application should obtain the store object 300 from the group property. The property of the store object 300 is the record watch list 302, which retrieves the list of record watcher objects 304 associated with the group store. The store object 300 exposes several static functions, including the get records function that creates a record collection 306 or records 308 of a specific type. If no particular type is specified, a snapshot of all the records is put in the collection 306. Alternatively, the get record method retrieves a single record 308 from the store. The store object 300 also exposes a method to add records to the store. The application creates a new record and sets its properties before adding it to the store. The store object 300 also provides a method to update an existing record in the store. An exception is raised, however, if the record does not already exist, has expired, or is marked for deletion. An application may also delete a record from the store via the delete static method. Finally, a purge function, which removes all of the records from the local machine, is also provided. The main purpose of this function is to support a Kiosk scenario in which the user does not want to persist and information on the local machine.

The record collection object 306 is a collection of records, usually of a specific type. The collection is a snapshot of the group database and obtained by using the method get records. Not specifying a record type will match all records. However, some types of records are not available to the application (participant records, group policy, etc.). This collection is read-only, but individual records can be modified by using the update method. This object 306 provides a count of the number of records in the collection. The record collection object 306 also exposes a function that retrieves a particular record 308 from the collection.

The record class object 308 is the base class for all records in the group database. The record (GUID type) constructor is the basic method to create a new record. The record will have a unique ID. After the other properties have been set, the record 308 must then be added to the store using the add record method. The record properties include the GUID ID, which is the unique identifier for this record, and is generated by the system. The creator peer name is the peer name of the user who created the record 308, and is also automatically set by the system. The type property specifies the type of the record. Some GUID values are reserved and will cause the record creation to fail if used. The creation time and the time of the last modification are also included. The expired property is set when the time specified for the record's lifetime has passed. The user who created the record can increase the expiration time. The expiration time property indicates when the record will expire. The record attributes are also specified. The data property represents the generic data storage (or payload) for the recorded.

As indicated above, the record watch list is a property of the store object 300. This object 302 retrieves the list of record watcher objects 304 associated with the group store. Its property is a count of the records in the watch list. This object exposes a method to retrieve a particular record watcher object 304, a method to add an item, and one to remove an item. The record watcher object 304 specifies the Guid of the record and the type of event change recorded by the record change event argument object 310. The change types are enumerated in the record change type object 312, and include an indication that a record has been created, updated, or deleted.

Figure 8:
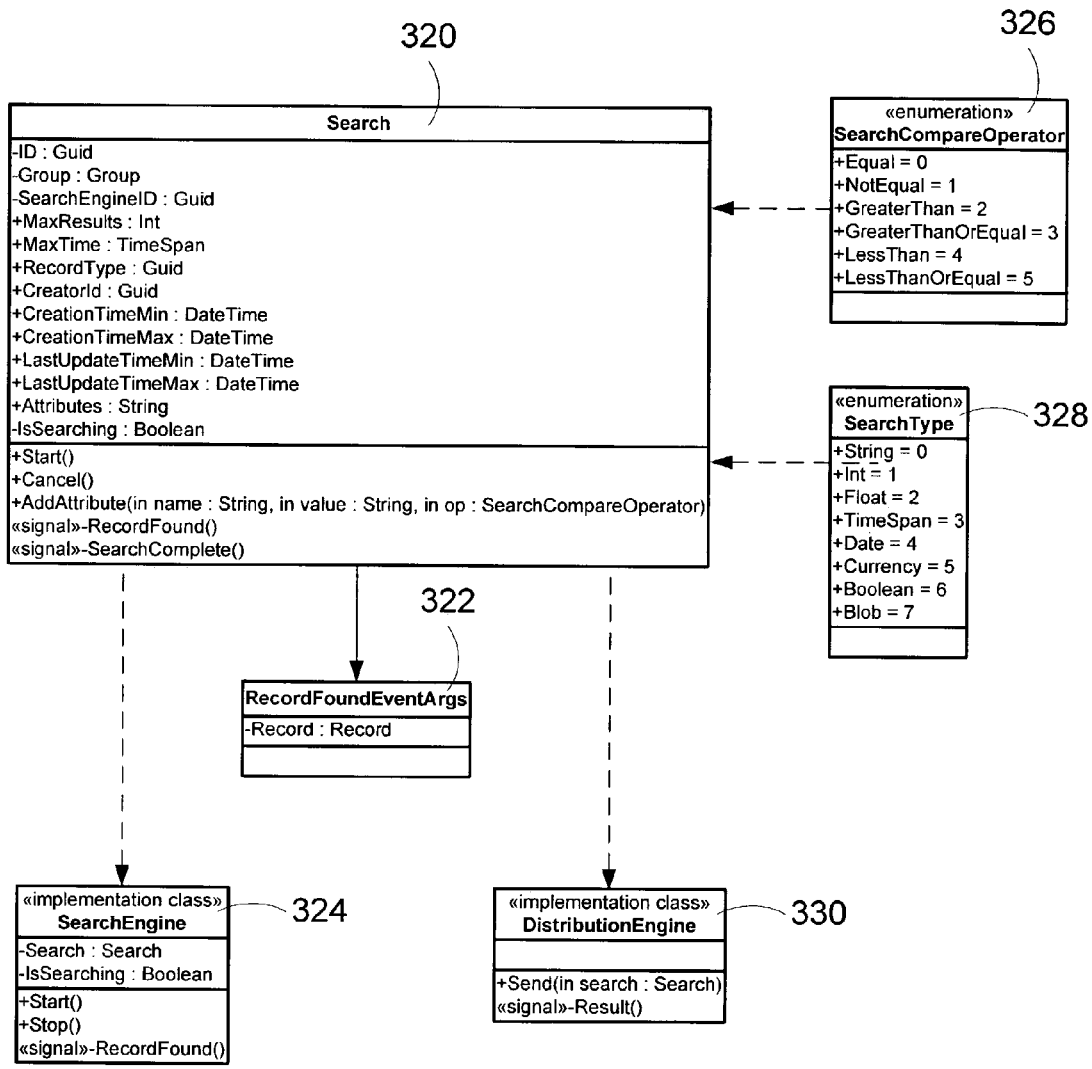
FIG. 8 illustrates the objects, collections, properties, methods, and implementation classes of the search object of the present invention.

As illustrated in FIG. 8, the search class 320 is used to define and control the search for records within the group. Application s can set the properties to limit the results. Further, attributes may be added one at a time through the add attribute method, when initially creating the object 320, or by sending the XML directly through the attributes property. Results are passed to the application through the record found event handler 322. The search must operate in a particular group. The application can then set the various properties to define the search criteria and establish an event handler before calling the start function. If the group is set to null, all know groups will be searched.

The properties for the search class 320 include a unique id for the search. The group in which the search is to be performed is also specified, as is the ID of the search engine 324 used in the group. The application may also limit the search by setting the maximum number or results to return before the search is stopped. The default is no limit. The maximum time during which the search will proceed is also specified, with a default of no limit. The record type and publisher of the record are also included as properties. The search class 320 also specifies the earliest and the latest date/time for the record, as well as the earliest and latest update times for the record. The XML representation of the attributes may also be specified. The is searching property indicates if the system is currently searching for records. Note that there is no event to indicate when this value changes. The search may end very quickly if the search is local and there are no records that match the criteria, or it may continue for a long time if a distributed search is used. It should be noted as well that in a preferred embodiment, the defaults for each of the settable properties just discussed provides the broadest search. The individual properties may be added to further specify, and therefore limit, the search.

The static methods exposed by the search object 320 include a start function to start the search process based on the current search criteria. The application should establish a callback to handle the results before invoking this method. The cancel function stops the search process. It cannot be resumed, but the application can restart the process by using the start method again. The add attribute method adds a name-value pair to the list of attributes. The type from the search type class 328 and comparison operation from the search compare operator class 326 are optional. The Attributes property is modified to reflect this change. The distribution engine implementation class 330 exposes the send function, and fires an event with the result.

The following is an example of code that illustrates the search for any attribute which contains the string "video" in accordance with one embodiment of the present invention. In this example, the MyDataFoundHandler callback is invoked as the search engine finds records. This happens asynchronously, not on the thread in which the search was started. The sample routine just extracts the record ID and the XML attributes, and then passes the data to another routine for further processing:

```
Search search = new Search(group);
search.AddAttribute("*video*");
search.DataFoundEvent +=
new Search.DataFoundHandler(MyDataFoundHandler));
search.Start( );
...
public void MyDataFoundHandler(Object sender,
RecordFoundEventArgs e)
{
Debug.Writeline("Found record " + e.Record.ID);
Debug.Writeline("Attributes: " + e.Record.Attributes);
}
```

The following is an example of code that illustrates a search for a video with some specific attributes, i.e. this sample refines this search to only look for a keyword of "video" with a "FileName" attribute that starts with "Jim." The * can be used to match zero or more characters. The * can appear more than once in the string. To match an asterisk, use the \* sequence.

```
Search search = new Search(group);
search.CreatorId = PeerId; // some guid
search.AddAttribute("KeyWord", "video");
search.AddAttribute("FileName", "Jim*");
search.DataFoundEvent +=
new Search.DataFoundHandler(MyDataFoundHandler));
search.Start( );
Debug.WriteLine("Search Attributes: " + search.Attributes);
...
```

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of managing by an application a peer-to-peer identity in a managed framework, the method comprising:
   creating a single peer-to-peer networking identity interface object exposing at least four methods to a calling application to enable the calling application to manipulate one or more peer identity objects, wherein the four methods are implemented as a set of objects separate and distinct from the peer-to-peer networking identity interface object and from the calling application, and wherein the at least four exposed methods include
   a creating method being one of the at least four methods that receives as input from the calling application via the interface a username, a user class, and a user key and outputs a peer identity object for receipt by the calling application via the interface,
   an importing method being one of the at least four methods that outputs for receipt by the calling application via the interface a peer identity object,
   a deleting method being one of the at least four methods that receives as input from the calling application via the interface a reference to a peer identity object, and
   an enumerating method being one of the at least four methods that outputs for receipt by the calling application via the interface a set of managed peer identity objects registered with a local machine and associated with a first user as an identity collection object;
   selecting by the calling application one of the methods exposed by the peer-to-peer networking identity object;
   passing by he calling application to the managed peer-to-peer networking identity interface object parameters required by the method selected; and
   initiating the selected method.

2. The method of claim 1, wherein the method selected in the step of selecting provides an identity collection object exposing an item method, the method further comprising the steps of selecting the item method, passing to the identity collection object a parameter identifying a particular identity, initiating the item method, and receiving the identity class object identified by the parameter.

3. The method of claim 1, wherein the method selected in the step of selecting provides an identity class object exposing an export method, the method further comprising the steps of selecting the export method to export the identity class object, passing the identity class object export parameters, and initiating the export method.

4. The method of claim 1, wherein the method selected in the step of selecting provides an identity class object exposing a create peer name method, the method further comprising the steps of selecting the create peer name method to create a new peer name class object, passing the identity class object new peer name parameters, and initiating the create peer name method to create a new peer name to associate with the identity class object.

5. The method of claim 1, comprising:
   creating a managed set of peer cloud class objects wherein each peer cloud class 9biect of the set of peer cloud class objects contains a unique cloud address type that is the, same for all nodes in a cloud that are reachable by a node of the cloud;
   creating a single managed peer-to-peer networking cloud interface object that exposes an enumeration method to a calling application, wherein the enumeration method outputs to the calling application the managed set of peer cloud class objects, wherein the enumeration method is implemented in a set of objects separate and distinct from the managed peer-to peer networking cloud interface object, the calling application, and the peer cloud class objects;
   communicating with the managed peer-to-peer networking cloud interface object by the calling application;
   passing by the calling application to the managed peer-to-peer networking cloud interface object parameters required by the enumeration method;
   initiating the enumeration method, the enumeration method providing a managed cloud collection class object containing the set of peer cloud class objects, the cloud collection class object exposing an item method to select a particular cloud; and
   selecting a particular cloud class object by the application using the select method of the cloud collection class object.

6. The method of claim 5, further comprising the steps of initiating a cloud watcher object to notify the application upon a change in the cloud.

7. The method of claim 5, further comprising
   creating a peer name registrar managed object;
   passing name parameters associated with a peer to the peer name registrar managed object; and
   initiating a register method exposed by the peer name registrar managed object, the peer name registrar managed object creating a discoverable peer name managed class object in response thereto, wherein the discoverable peer name managed class object includes a cloud class object that is associated with the peer and that contains a cloud address type and a cloud network scope for which a cloud is valid.

8. The method of claim 7, further comprising the steps of passing peer name parameters to the peer name registrar managed object to identify a discoverable peer name, and initiating an unregistered method exposed by the peer name registrar managed object, the peer name registrar managed object deleting the discoverable peer name class object identified by the peer name parameters.

9. The method of claim 5, further comprising
   creating a peer name resolver managed object; passing peer name parameters to the peer name resolver managed object; and initiating a start resolution method exposed by the peer name resolver managed object, the peer name resolver managed object returning a discoverable peer name managed class object in response thereto, wherein the discoverable peer name managed class object includes a cloud class object that is associated with the peer and that contains a cloud address type and a cloud network scope for which a cloud is valid.

* * * * *